(12) United States Patent
Ruaro et al.

(10) Patent No.: US 10,950,932 B1
(45) Date of Patent: Mar. 16, 2021

(54) ELECTRONIC DEVICE WIDE BAND ANTENNAS

(71) Applicant: Apple Inc., Cupertino, CA (US)

(72) Inventors: Andrea Ruaro, Campbell, CA (US); Eduardo Jorge Da Costa Bras Lima, Sunnyvale, CA (US); Mario Martinis, Cupertino, CA (US); Dimitrios Papantonis, Cupertino, CA (US); Jayesh Nath, Milpitas, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,159

(22) Filed: Sep. 26, 2019

(51) Int. Cl.
*H01Q 13/10* (2006.01)
*H01Q 1/52* (2006.01)
*H04R 1/02* (2006.01)
*H04B 1/3827* (2015.01)
*H01Q 1/27* (2006.01)
*H01Q 1/48* (2006.01)

(52) U.S. Cl.
CPC ............. *H01Q 1/521* (2013.01); *H01Q 1/273* (2013.01); *H01Q 1/48* (2013.01); *H01Q 13/10* (2013.01); *H04B 1/385* (2013.01); *H04R 1/025* (2013.01)

(58) Field of Classification Search
CPC .......... H01Q 1/521; H01Q 1/48; H01Q 1/273; H01Q 13/10; H01Q 13/18; H04B 1/385; H04R 1/025
See application file for complete search history.

(56) References Cited

U.S. PATENT DOCUMENTS

| | | | |
|---|---|---|---|
| 6,483,466 B2 | 11/2002 | Liu | |
| 6,834,181 B2 | 12/2004 | Kaikuranta et al. | |
| 7,428,431 B2 | 9/2008 | Timms | |
| 8,599,089 B2 | 12/2013 | Bevelacqua et al. | |
| 9,178,268 B2 | 11/2015 | Zhu et al. | |
| 9,203,137 B1* | 12/2015 | Guterman | H01Q 1/243 |
| 9,425,496 B2 | 8/2016 | Zhu et al. | |
| 9,455,489 B2 | 9/2016 | Shiu et al. | |
| 9,653,777 B2 | 5/2017 | Guterman et al. | |
| 2005/0017914 A1 | 1/2005 | Huang | |
| 2007/0091004 A1* | 4/2007 | Puuri | H01Q 13/10 |
| | | | 343/718 |
| 2013/0342408 A1 | 12/2013 | Chang et al. | |
| 2014/0086441 A1* | 3/2014 | Zhu | H01Q 1/243 |
| | | | 381/332 |
| 2018/0358686 A1* | 12/2018 | Park | H01Q 9/42 |

* cited by examiner

*Primary Examiner* — Hoang V Nguyen
(74) *Attorney, Agent, or Firm* — Treyz Law Group, P.C.; Tianyi He

(57) ABSTRACT

An electronic device may have a housing with metal sidewalls. One of the metal sidewalls may have an opening. The electronic device may have a speaker module that has a speaker housing member. Conductive structures on the speaker housing member may have an opening that forms a slot element. The opening of the metal sidewall may be aligned with slot element. The slot element and an interior cavity of the speaker housing member may form a cavity-backed slot antenna. An antenna feed structure may be disposed at the opening of the speaker housing member. An antenna feed may be directly coupled to the antenna feed structure. The antenna feed structure may indirectly feed the slot antenna resonating element by capacitive coupling. A sealing member may be disposed at the opening of the metal sidewall.

20 Claims, 8 Drawing Sheets

ELECTRONIC DEVICE WIDE BAND ANTENNAS

BACKGROUND

This relates to electronic devices and, more particularly, to electronic devices with wireless communications circuitry.

Electronic devices are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device such as a wristwatch device may have a housing with metal portions such as metal sidewalls. A metal sidewall may have an elongated slot. The electronic device may include an electronic component module such as a speaker module having a (speaker) module housing member with (speaker) module housing walls. One or more speaker housing walls may have conductive structures formed on respective external surfaces of the speaker housing walls. The conductive structures may have an elongated opening that is aligned with the elongated slot in the metal sidewall. The speaker housing member may have a cavity defined by an interior surface of the speaker housing member and extending to an open end at the opening. The conductive structure may surround the cavity. The conductive structure may be grounded to the metal sidewall. The opening in the conductive structures may form a slot antenna resonating element for an antenna. An antenna feed structure may be disposed in the opening. The slot antenna resonating element may be backed by the cavity. The antenna formed from the slot antenna resonating element, the antenna feed structure, and the cavity, may be a cavity-backed indirectly-fed slot antenna.

The antenna may include an antenna feed having a positive antenna feed terminal coupled to the antenna feed structure and a ground antenna feed terminal coupled to the conductive structures. Transceiver circuitry may be coupled to antenna feed using a transmission line structure and may be configured to operate the antenna in an ultra-wideband communications (frequency) band between a frequency of 5 GHz and a frequency of 8.5 GHz. The antenna feed structure may directly receive antenna signals and may be configured to induce current to flow around a perimeter of the opening in the conductive structures. The antenna feed structure may have first and second opposing edges that are respectively coupled indirectly (capacitively) to first and second opposing edges of the opening in the conductive structure.

The electronic device may include a liquid barrier interposed between and aligned with the elongated slot in the metal sidewall and the elongated opening in the conductive structures. The liquid barrier may serve as a water seal (sealant) configured to prevent water from entering an interior of the electronic device. The speaker housing member may be mounted to the metal sidewall using an attachment structure such as conductive tape and may be held in place using a retaining member.

DETAILED DESCRIPTION

Figure 1:
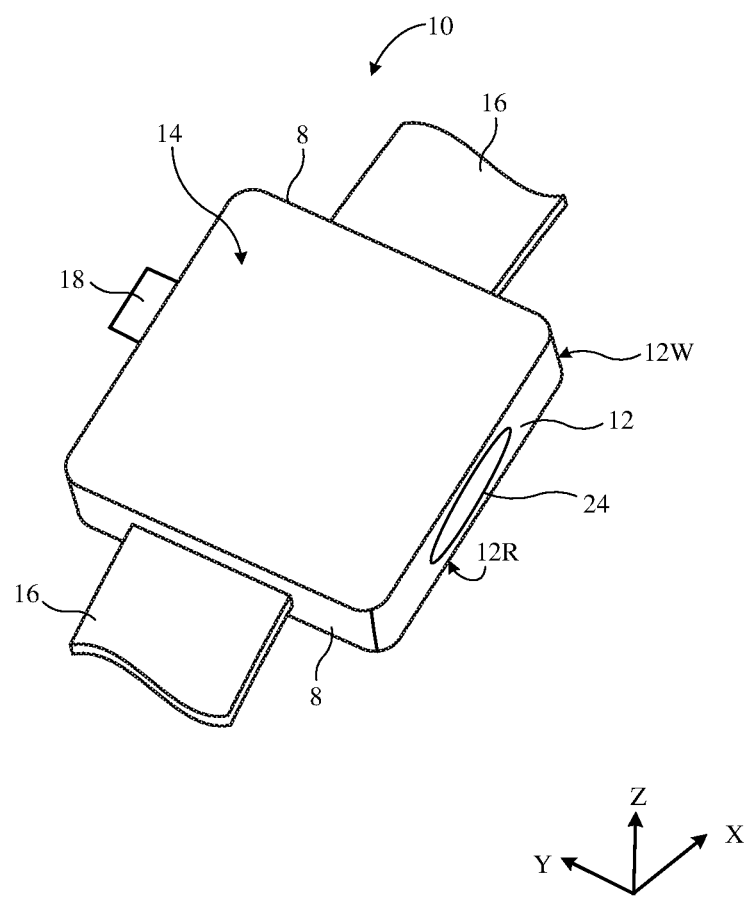
FIG. 1 is a front perspective view of an illustrative electronic device with wireless circuitry in accordance with some embodiments.

An electronic device such as electronic device 10 of FIG. 1 may be provided with wireless circuitry. The wireless circuitry may be used to support wireless communications in multiple wireless communications (frequency) bands. The wireless circuitry may include antennas. Antennas may be formed from electronic components such as displays, touch sensors, near-field communications antennas, wireless power coils, peripheral antenna resonating elements, conductive traces, and device housing structures, electronic component modules, as examples.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as conductive sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive sidewalls 12W may surround the periphery of device 10 (e.g., conductive sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive sidewalls 12W may extend across some or all of the height of device 10 (e.g., parallel to Z-axis). Conductive sidewalls 12W and/or the rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Housing 12 may include additional openings, such as opening 24. Opening 24 may sometimes be referred to as a slot, cavity, hole, aperture, or port. Opening 24 may be a single continuous and elongated opening formed on a corresponding conductive sidewall 12W. As shown in FIG. 1, opening 24 may be formed along the sidewall 12W opposite to the sidewall 12W at which button 18 is disposed. In other words, button 18 and opening 24 may be located on opposing sides of device 10.

This configuration for opening 24 is merely illustrative. If desired, opening 24 may be formed in any portion of housing 12. As examples, opening 24 may be formed in rear housing wall 12R, in the same sidewall 12W as button 18, in any other sidewall 12W, etc.

In some configurations, opening 24 may serve as an audio port or speaker port (e.g., a speaker opening or a speaker hole) through which audio signals generated from speaker components within device 10 pass to the exterior of device 10. In such configurations, opening 24 may be aligned with a speaker box or a speaker cavity at the interior of device 10. As an example, the speaker box may include a speaker driver and/or other speaker components for producing sound that passes through opening 24.

Configurations in which opening 24 serves as an audio or speaker port are merely illustrative. If desired, opening 24 may serve as an opening for other purposes (e.g., for cosmetic purposes, for sensor purposes, for attachment purposes, etc.). Additionally, opening 24 may have any desired shape: a rectangular shape, an elliptical shape, shapes with curved edges, shapes with straight edges, shapes with curved and straight edges, etc. If desired, opening 24 may be filed with a dielectric material such as rubber, plastic, ceramic, polymer, glass, sapphire, fabric, mesh materials, air, or other dielectrics.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides 8 of device 10. Conductive sidewalls 12W on sides 8 of device 10 may include attachment structures for securing wrist strap 16 to housing 12 (e.g., lugs or other attachment mechanisms that configure housing 12 to receive wrist strap 16). Configurations that do not include straps may also be used for device 10.

Figure 2:
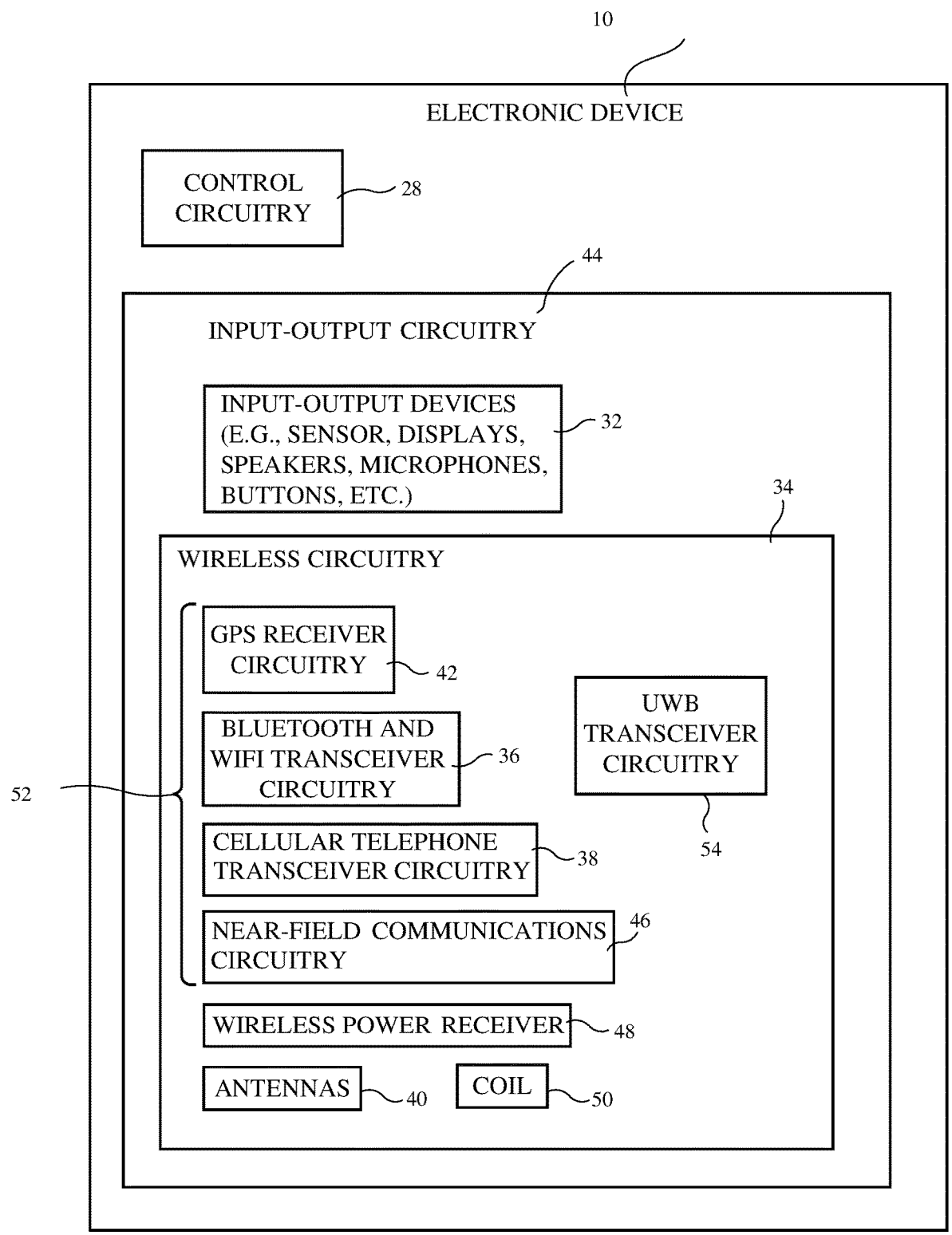
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry. The storage circuitry may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may also include processing circuitry. The processing circuitry may be used to control the operation of device 10. The processing circuitry may include one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on the storage circuitry of control circuitry 28 (e.g., the storage circuitry may include non-transitory (tangible) computer readable storage media that stores the software code). The software code may sometimes be referred to as program instructions, software, data, instructions, or code. Software code stored on the storage circuitry of control circuitry 28 may be executed by the processing circuitry of control circuitry 28.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34 (sometimes referred to herein as wireless communications circuitry 34). Wireless circuitry 34 may include coil 50 and wireless power receiver 48 for receiving wirelessly transmitted power from a wireless power adapter. Wireless power receiver 48 may include, for example, rectifier circuitry and other circuitry for powering or charging a battery on device 10 using wireless power received by coil 50. Coil 50 may, as an example, receive wireless power through rear housing wall 12R (FIG. 1) when mounted to a wireless power adapter. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals may also be sent using light (e.g., using infrared communications).

Wireless circuitry 34 may include radio-frequency transceiver circuitry 52 for handling various radio-frequency communications bands. For example, radio-frequency transceiver circuitry 52 may include Bluetooth® and WiFi® transceiver circuitry 36, cellular telephone transceiver circuitry 38, Global Positioning System (GPS) receiver circuitry 42, near-field communications circuitry 46, and ultra-wideband (UWB) transceiver circuitry 54. Bluetooth® and WiFi® Transceiver circuitry 36 may be wireless local area network (WLAN) and/or wireless personal area network (WPAN) transceiver circuitry. Bluetooth® and WiFi® Transceiver circuitry 36 may handle 2.4 GHz and 5 GHz bands for WiFi® (IEEE 802.11) communications or other WLAN bands and may handle the 2.4 GHz Bluetooth® communications band or other WPAN bands. Transceiver circuitry 36 may sometimes be referred to herein as WLAN transceiver circuitry 36.

Wireless circuitry 34 may use cellular telephone transceiver circuitry 38 (sometimes referred to herein as cellular transceiver circuitry 38) for handling wireless communications in frequency ranges (communications bands) such as a low band (sometimes referred to herein as a cellular low band LB) from 600 to 960 MHz, a midband (sometimes referred to herein as a cellular midband MB) from 1400 or 1700 MHz to 2170 or 2200 MHz, and a high band (sometimes referred to herein as a cellular high band HB) from 2200 or 2300 MHz to 2700 MHz (e.g., a high band with a peak at 2400 MHz) or other communications bands between 600 MHz and 4000 MHz or other suitable frequencies (as examples). Cellular transceiver circuitry 38 may handle voice data and non-voice data.

Wireless circuitry 34 may include satellite navigation system circuitry such as Global Positioning System (GPS) receiver circuitry 42 for receiving GPS signals at 1575 MHz or for handling other satellite positioning data (e.g., GLONASS signals at 1609 MHz). Satellite navigation system signals for receiver 42 are received from a constellation of satellites orbiting the earth.

Wireless circuitry 34 may include ultra-wideband (UWB) transceiver circuitry 54 that supports communications using the IEEE 802.15.4 protocol and/or other wireless communications protocols (e.g., ultra-wideband communications protocols). Ultra-wideband wireless signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). Transceiver circuitry 54 may operate (i.e., convey radio-frequency signals) in frequency bands such as an ultra-wideband frequency band (i.e., an ultra-wideband communications band) between about 5 GHz and about 8.5 GHz (e.g., a 6.5 GHz frequency band, an 8 GHz frequency band, and/or at other suitable frequencies).

Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 46 (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® communications band at 5.0 GHz, one or more cellular telephone communications bands such as a cellular midband between about 1700 MHz and 2200 MHz and a cellular high band between about 2200 and 2700 MHz, and UWB communications band between about 5 GHz and 8.3 GHz. If desired, a combination of antennas for covering multiple frequency bands and dedicated antennas for covering a single frequency band may be used.

It may be desirable to implement at least some of the antennas in device 10 using portions of electronic components that would otherwise not be used as antennas and that support additional device functions. As an example, it may be desirable to induce antenna currents in components such as display 14 (FIG. 1), so that display 14 and/or other electronic components (e.g., a touch sensor, near-field communications loop antenna, conductive display assembly or housing, conductive shielding structures, etc.) can serve as part of an antenna for Wi-Fi, Bluetooth, GPS, cellular frequencies, UWB, and/or other frequencies without the need to incorporate separate bulky antenna structures in device 10.

Figure 3:
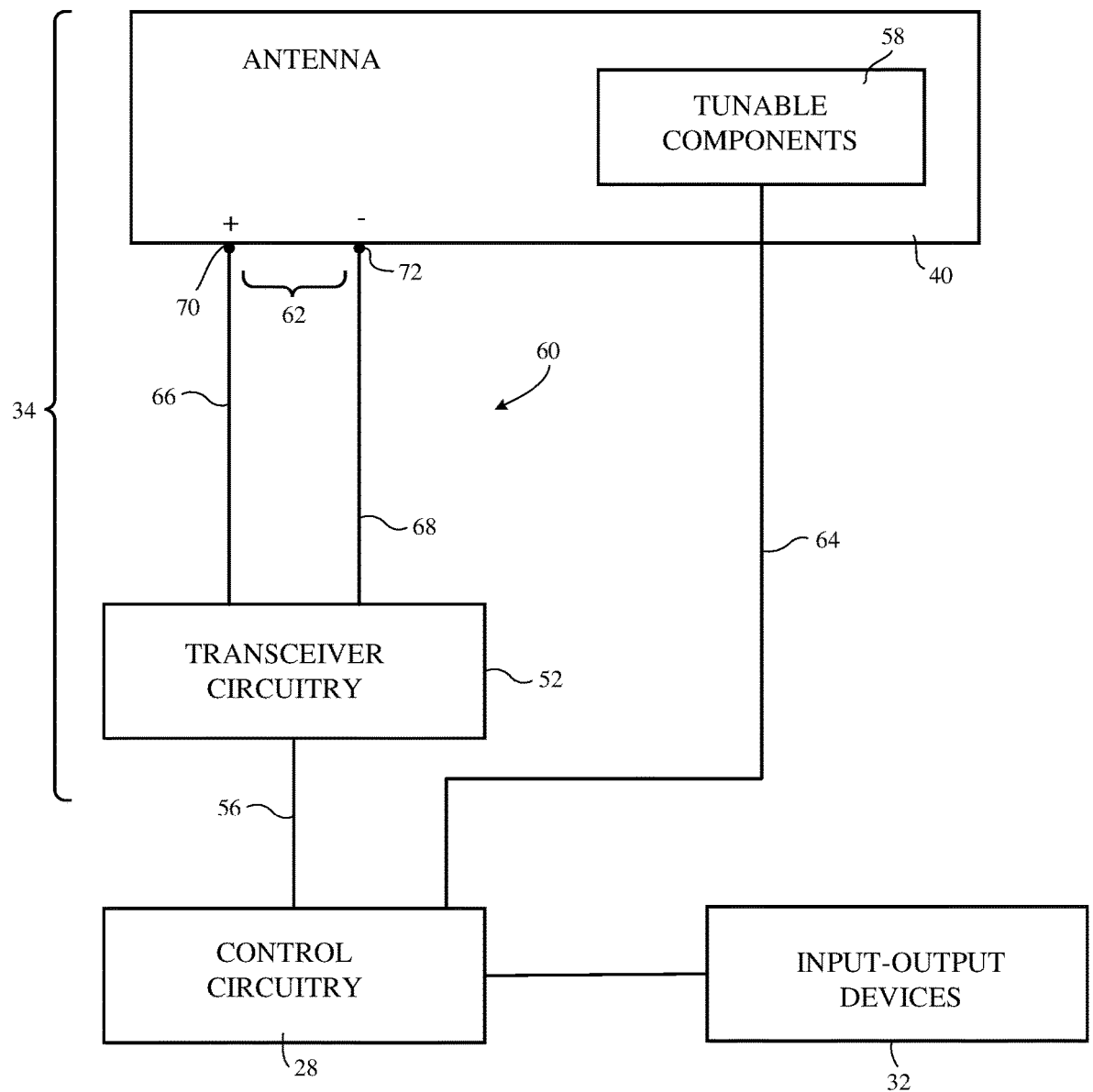
FIG. 3 is a diagram of illustrative wireless circuitry in an electronic device in accordance with some embodiments.

FIG. 3 is a diagram showing how transceiver circuitry 52 in wireless circuitry 34 may be coupled to antenna structures of a corresponding antenna 40 using signal paths such as radio-frequency transmission line 60. Wireless circuitry 34 may be coupled to control circuitry 28 over data and control path 56. Control circuitry 28 may be coupled to input-output devices 32. Input-output devices 32 may supply output from device 10 and may receive input from sources that are external to device 10.

To provide antenna 40 with the ability to cover communications bands (frequencies) of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 58 to tune the antenna over communications bands of interest. Tunable components 58 may include tunable inductors, tunable capacitors, or other tunable components. Tunable components such as these may be based on switches and networks of fixed components, distributed metal structures that produce associated distributed capacitances and inductances, variable solid-state devices for producing variable capacitance and inductance values, tunable filters, or other suitable tunable structures.

During operation of device 10, control circuitry 28 may issue control signals on one or more paths such as path 64 that adjust inductance values, capacitance values, or other parameters associated with tunable components 58, thereby tuning antenna 40 to cover desired communications bands.

Radio-frequency transmission line 60 may include a positive signal line such as signal conductor 66 and a ground signal line such as ground conductor 68. Radio-frequency transmission line 60 may include a coaxial cable, stripline transmission line, microstrip transmission line, edge-coupled microstrip transmission line, edge-coupled stripline transmission line, waveguide structure, combinations of these, etc.

Transmission lines in device 10 such as radio-frequency transmission line 60 may be integrated into rigid and/or flexible printed circuit boards if desired. In one suitable arrangement, transmission lines such as radio-frequency transmission line 60 may also include transmission line conductors (e.g., signal conductor 66 and ground conductor 68) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network formed from components such as inductors, resistors, and capacitors may be used in matching the impedance of antenna 40 to the impedance of radio-frequency transmission line 60. Matching network components may be provided as discrete components (e.g., surface mount technology components) or may be formed from housing structures, printed circuit board structures, traces on plastic supports, etc. Matching network components may, for example, be interposed on radio-frequency transmission line 60. The matching network components may be adjusted using control signals received from control circuitry 28 if desired. Components such as these may also be used in forming filter circuitry in antenna 40 (e.g., tunable components 58).

Radio-frequency transmission line 60 may be directly connected to an antenna resonating element and antenna ground for antenna 40 or may be coupled to antenna feed structures that are used in indirectly feeding an antenna resonating element for antenna 40. As an example, antenna 40 may be a slot antenna, an inverted-F antenna, a loop antenna, a patch antenna, or other antenna having an antenna feed 62 with a positive antenna feed terminal such as positive antenna feed terminal 70 and a ground antenna feed terminal such as ground antenna feed terminal 72. Signal conductor 66 may be coupled to positive antenna feed terminal 70 and ground conductor 68 may be coupled to ground antenna feed terminal 72.

If desired, antenna 40 may include an antenna resonating element that is indirectly fed using near-field coupling. In an indirect feeding arrangement, radio-frequency transmission line 60 may be coupled to an antenna feed structure that indirectly feeds antenna structures such as an antenna resonating element via near-field electromagnetic coupling. This example is merely illustrative and, in general, any desired antenna feeding arrangement may be used.

Figure 4:
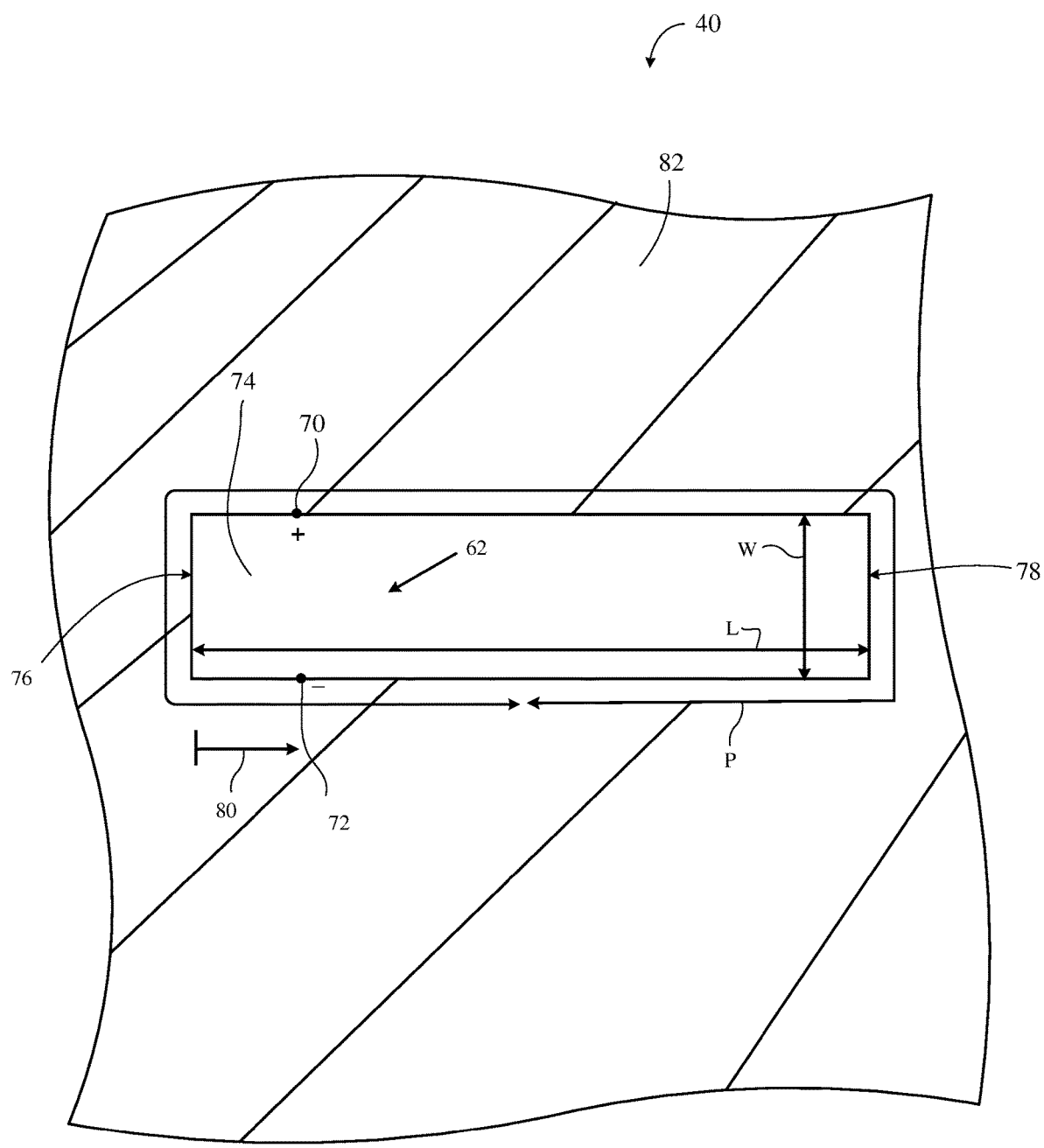
FIG. 4 is a schematic diagram of an illustrative slot antenna in accordance with some embodiments.

Antenna 40 may be formed using any desired antenna structures. In one suitable arrangement, antenna 40 may be formed using a slot antenna structure. An illustrative slot antenna structure that may be used for forming antenna 40 is shown in FIG. 4. As shown in FIG. 4, antenna 40 may include a conductive structure such as conductor 82 that has been provided with a dielectric opening such as dielectric opening 74. Opening 74 may sometimes be referred to herein as slot 74, slot antenna resonating element 74, slot element 74, or slot radiating element 74. In the configuration of FIG. 4, slot element 74 is a closed slot, because portions of conductor 82 completely surround and enclose slot element 74.

Antenna feed 62 for antenna 40 may be formed using positive antenna feed terminal 70 and ground antenna feed terminal 72. In general, the frequency response of an antenna is related to the sizes and shapes of the conductive structures in the antenna. Slot antennas of the type shown in FIG. 4 tend to exhibit response peaks when slot perimeter P is equal to the effective wavelength of operation of antenna 40 (e.g. where perimeter P is equal to two times length L plus two times width W). The effective wavelength of operation may be equal to a freespace wavelength multiplied by a constant value that is determined by the dielectric materials in and surrounding slot element 74. Antenna currents may flow between antenna feed terminals 70 and 72 around perimeter P of slot element 74. In the example where slot length L is much greater than slot width W, the length of antenna 40 will tend to be about half of the length of other types of antennas such as inverted-F antennas configured to handle signals at the same frequency. Given equal antenna volumes, antenna 40 may therefore be able to handle signals at approximately twice the frequency of other antennas such as inverted-F antennas, for example.

Antenna feed 62 may be coupled across slot element 74 at a location between opposing edges 76 and 78 of slot element 74. For example, antenna feed 62 may be located at a distance 80 from edge 76 of slot element 74. Distance 80 may be adjusted to match the impedance of antenna 40 to the impedance of radio-frequency transmission line 60 (FIG. 3). For example, the antenna current flowing around slot element 74 may experience an impedance of zero at edges 76 and 78 of slot element 74 (e.g., a short circuit impedance) and an infinite (open circuit) impedance at the center of slot element 74 (e.g., at a fundamental frequency of the slot). Antenna feed 62 may be located between the center of slot element 74 and edge 76 at a location where the antenna current experiences an impedance that matches the impedance of radio-frequency transmission line 60, for example (e.g., distance 80 may be between 0 and ¼ of the effective wavelength of operation of antenna 40).

The example of FIG. 4 is merely illustrative. In general, slot element 74 may have any desired shape (e.g., where the perimeter P of slot element 74 defines radiating characteristics of antenna 40). For example, slot element 74 may have a meandering shape with different segments extending in different directions, may have straight and/or curved edges, etc. Conductor 82 may be formed from any desired conductive electronic device structures. For example, conductor 82 may include conductive traces on printed circuit boards or other substrates, sheet metals, metal foils, conductive structures associated with display 14 (FIG. 1), conductive portions of housing 12 (e.g., conductive sidewalls 12W of FIG. 1), or other conductive structures within device 10. In one suitable arrangement, different sides (edges) of slot element 74 are defined by different conductive structures. For example, one side of slot element 74 may be formed from conductive sidewalls 12W whereas the other side of slot element 74 is formed from conductive structures associated with display 14.

In some applications, it may be desirable to improve the antenna performance of an electronic device to provide increased bandwidth and to cover additional frequencies of interest such as frequencies in an ultra-wideband communications band between about 5 GHz and about 8.5 GHz. To at least partly meet performance requirements and provide additional antenna frequency coverage especially in an ultra-wideband communications band, antenna 40 may be formed from a slot element that is indirectly fed by an antenna feed structure within the slot element.

Figure 5:
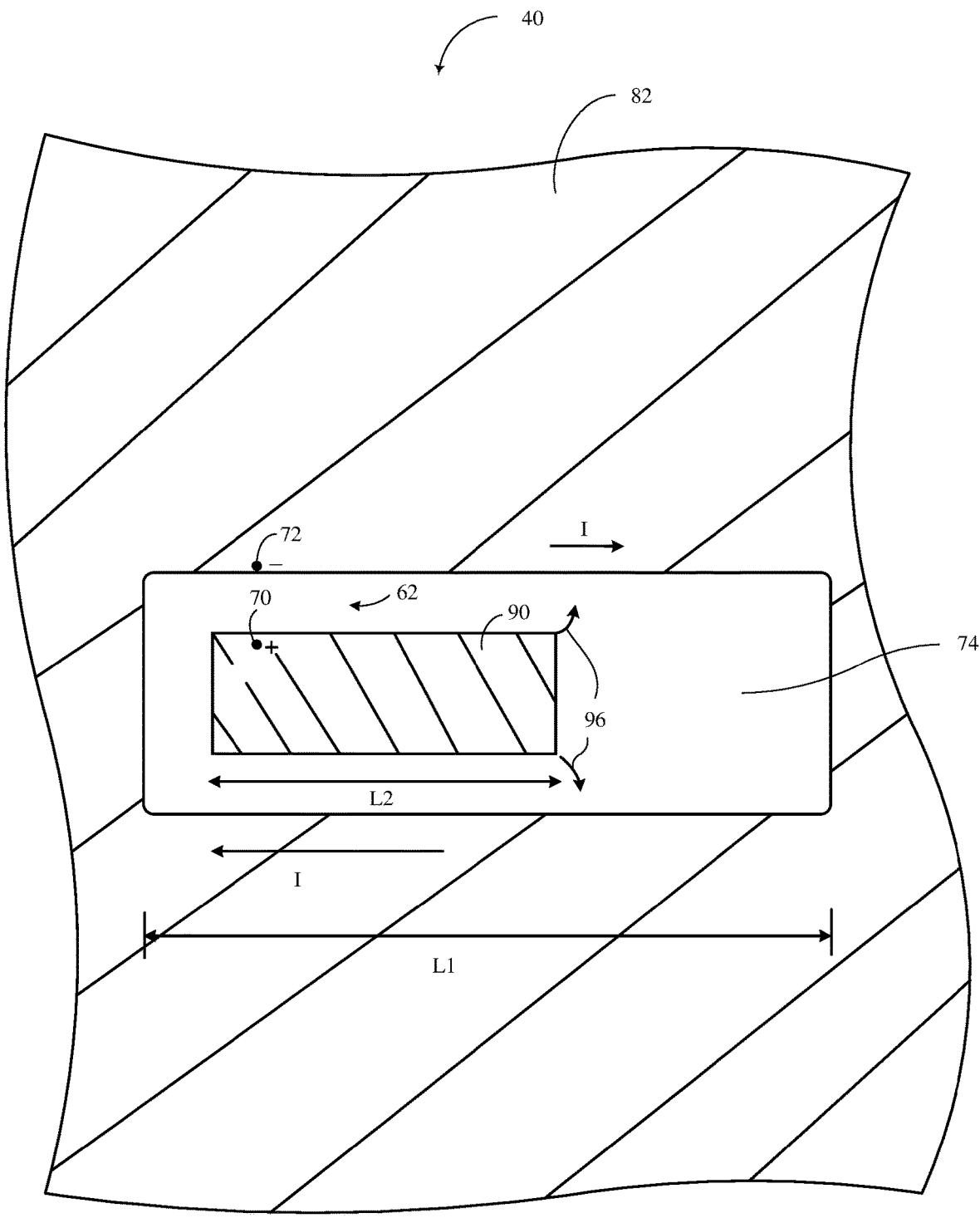
FIG. 5 is a schematic diagram of an illustrative indirectly-fed slot antenna in accordance with some embodiments.

FIG. 5 is a diagram showing how antenna 40 may be formed from a slot element that is indirectly fed by an antenna feed structure within the slot element. As shown in FIG. 5, antenna 40 may include an antenna feed structure such as antenna feed structure 90 (sometimes referred to as antenna feed element 90 or antenna element 90) disposed within slot element 74. Antenna feed 62 may be coupled between antenna feed structure 90 and conductor 82 (e.g., positive antenna feed terminal 70 may be coupled to antenna feed structure 90 whereas ground antenna feed terminal 72 is coupled to conductor 82). Antenna feed structure 90 may be formed from a strip of conductive material (e.g., a conductive trace patterned on a dielectric substrate within slot element 74).

When antenna feed 62 is transmitting radio-frequency signals, corresponding antenna currents may flow along the perimeter of antenna feed structure 90. These antenna currents may excite antenna current I to flow along the perimeter of slot element 74 via near-field electromagnetic (e.g., capacitive) coupling 96. Antenna current I may produce wireless radio-frequency signals that are radiated by antenna 40 (e.g., antenna feed structure 90 may serve as an indirect feed element that excites antenna 40 to radiate radio-frequency signals). Similarly, when antenna 40 is receiving radio-frequency signals, the received radio-frequency signals may produce antenna currents I on slot element 74.

Antenna currents I may produce corresponding antenna currents on antenna feed structure 90 (e.g., via near-field electromagnetic coupling 96) that are received by antenna feed 62.

As shown in FIG. 5, antenna feed structure 90 may be an elongated conductive element that extends along a longitudinal axis (e.g., the longest dimension) running parallel to the longitudinal axis of slot element 74. For example, slot element 74 may have a length L1 whereas antenna feed structure 90 has a smaller length L2 that runs parallel to length L1 of slot element 74. In the illustrative example of FIG. 5, antenna feed structure 90 is disposed at the left side of slot element 74. For example, the gap between the left edge of antenna feed structure 90 and the left edge of conductor 82 defining slot element 74 may be smaller than the gap between the right edge of antenna feed structure 90 and the right edge of conductor 82 defining slot element 74. However, this is merely illustrative. If desired, antenna feed structure 90 may be disposed at the right side of slot element 74, at the center of slot element 74, or may disposed at any suitable location within slot element 74.

The radio-frequency performance of antenna 40 may be tuned by adjusting the length and/or placement of antenna feed structure 90 within slot element 74. As an example, by extending the length of antenna feed structure 90, antenna 40 may exhibit a change in frequency response (e.g., an increase in antenna efficiency at some frequencies and a decrease in antenna efficiency at other frequencies) because of the change in capacitive coupling between antenna feed structure 90 and conductor 82. As another example, by moving antenna feed structure 90 within slot element 74, the feed location for slot antenna resonating element 74 may be changed. Changing the feed location for antenna feed 62 may adjust the impedance of antenna 40 (e.g., to have better impedance matching characteristics with a radio-frequency transmission line coupled to antenna feed 62). As such, the antenna performance of antenna 40 may be altered by adjusting the length and/or position of antenna feed structure 90 without requiring adjustment to the dimensions of slot element 74 and/or conductor 82, which may be bound by more stringent device space constraints and other manufacturing constraints.

In the example of FIG. 5, antenna feed structure 90 is formed within the same plane as conductor 82 (e.g., the plane of the page for FIG. 5). If desired, antenna feed structure 90 may be formed in a parallel plane that is different from the plane on which conductor 82 is formed. More generally, antenna feed structure 90 and conductor 82 may be configured in any desirable manner, such that one or more edges of antenna feed structure 90 are indirectly (near-field) coupled to one or more corresponding opposing edges of conductor 82.

As an example, antenna feed structure 90 may be provided with opposing upper and lower edges that are respectively located equidistant from the upper and lower opposing edges of slot element 74 (e.g., where slot element 74 forms an upper gap between the upper edge of antenna feed structure 90 and the upper edge of slot element 74 and where slot element 74 forms a lower gap between the lower edge of antenna feed structure 90 and the lower edge of slot element 74). Antenna feed 62 is coupled across the upper gap, and the upper gap is the same size as the lower gap in the example of FIG. 5. This is merely illustrative. If desired, antenna feed 62 may be coupled across the lower gap and/or the lower gap may be larger or smaller than the upper gap.

Antenna feed 62 may be coupled between the left edge of antenna feed structure 90 and the left edge of slot element 74, if desired.

Figure 6:
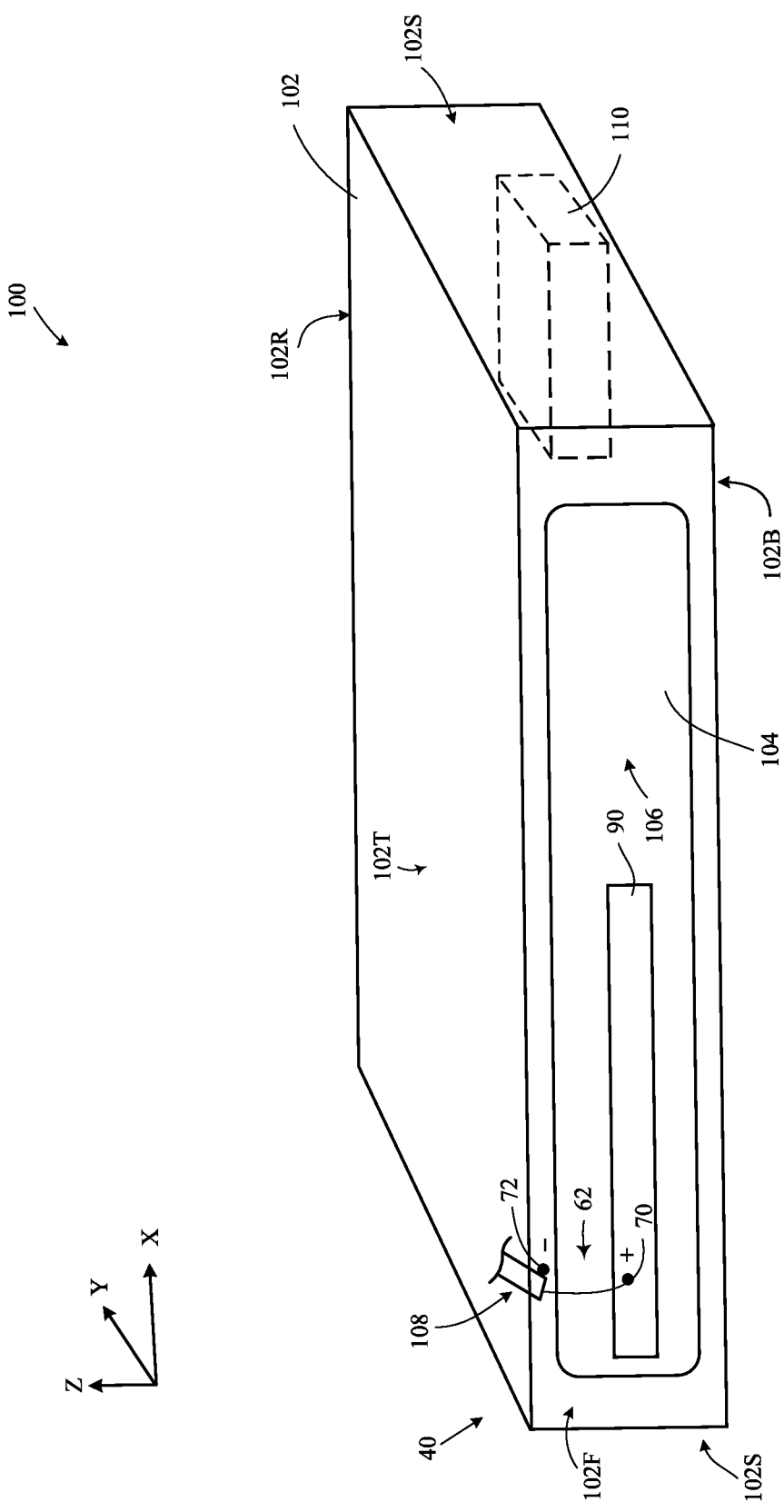
FIG. 6 is a front perspective view of an illustrative electronic component module having conductive walls and a cavity that are used to form an antenna in accordance with some embodiments.

FIG. 6 shows a perspective view of an illustrative system 100 that may implement an indirectly-fed slot antenna of the type shown in FIG. 5. In particular, system 100 may be a speaker module, an electronic component module having a cavity, a cavity system used to house components, or any other suitable system implemented in device 10 (FIG. 1). The illustrative example where system 100 is a speaker module is described herein as an example. As such, system 100 may be referred to herein as speaker system 100 or speaker module 100. However, system 100 may be implemented as a non-speaker system and/or using other components or structures as desirable.

As an example, speaker module 100 may include a speaker housing member (e.g., a speaker box) such as speaker housing member 102. In scenarios where system 100 is more generally an electronic component module, housing member 102 may generally be referred to as module housing member 102 or component housing member 102. Speaker housing member 102 may have a cuboid shape with six sides (faces) formed from six rectangles placed at right angles with respect to each other. As shown in FIG. 6, for example, speaker housing member 102 may have front and back speaker housing walls 102F and 102R parallel to the X-Z plane. Speaker housing member 102 may have top and bottom speaker housing walls 102T and 102B parallel to the X-Y plane. Speaker housing member 102 may have two left and right speaker housing walls 102S (sometimes referred as the two side speaker housing walls 102S) parallel to the Y-Z plane.

Front speaker housing wall 102F may have an opening 104 (sometimes referred to herein as slot 104, aperture 104, or slot element 104). Speaker housing member 102 may define an interior cavity such as cavity 106. The six speaker housing walls may define cavity 106, such that cavity 106 has edges defined by the speaker housing walls. As an example, cavity 106 may be fully enclosed at speaker housing walls 102T, 102B, 102R, and 102S (both left and right housing walls) and may only be partially enclosed at speaker housing wall 102F. Cavity 106 may have an open end at opening 104. In other words, speaker housing member 102 may have cavity 106 that connects to the exterior of speaker housing member 102 via an opening at speaker housing wall 102F (e.g., opening 104).

Speaker housing member 102 may be formed from materials such as plastic, fiber-based composites, conductive materials (e.g., metal), other materials, or a combination of these materials. As an example, speaker housing member 102 may be formed from a hollow dielectric support structure such as a hollow box-shaped structure or any other structure surrounding cavity 106. Conductive structures may be formed on one or more of the exterior surfaces of the hollow dielectric support structure to provide a conductive exterior to speaker housing member 102. If desired, conductive structures may also be formed on one or more interior surfaces of the hollow dielectric support structure. The conductive structures of speaker housing member 102 may be electrically connected to one or more grounding structure such as one or more conductive portions of housing 12 (FIG. 1).

In some configurations, the external surface of each speaker housing wall may be patterned with conductive material such as metal (e.g., metal traces). For example, front speaker housing wall 102F, back speaker housing wall 102B, top speaker housing wall 102T, bottom speaker housing wall 102B, and the two side speaker housing walls 102S may each include dielectric walls (e.g., dielectric walls of a hollow dielectric support structure) that are covered with a layer of conductive material (e.g., that are patterned with conductive traces, covered with metal foil, etc.). If desired, conductive material may only cover some of each or a subset of these speaker housing walls. For example, the conductive material on front speaker housing wall 102F may have an opening that aligns with opening 104. If desired, all of the speaker housing walls except rear speaker housing wall 102R may have a conductive layer at its exterior surface, such that rear wall 102 has a dielectric exterior surface.

The conductive structures on speaker module 100 may be used to implement an indirectly-fed slot antenna of the type shown in FIG. 5. For example, conductive material on front speaker housing wall 102F may define the edges of opening 104. Opening 104 may therefore form a slot element for antenna 40 (e.g., a slot antenna resonating element or a slot antenna radiating element for antenna 40 such as conductor 82 and slot element 74 of FIG. 5). The conductive material on top speaker housing wall 102T, front speaker housing wall 102F, bottom speaker housing wall 102B, the two side speaker housing walls 102S, and optionally rear speaker housing wall 102R may define conductive edges of cavity 106, which thereby serves as an antenna cavity that backs antenna 40 (e.g., backs opening 104 forming a slot antenna resonating element for antenna 40, sometimes referred to as slot element 104 or slot resonating element 104). More specifically, conductive structures on top speaker housing wall 102T, bottom speaker housing wall 102B, the two side speaker housing walls 102S, and optionally 102R may define a grounded cavity for slot antenna resonating element 104.

Antenna 40 may therefore sometimes be referred to as a cavity-backed antenna, a cavity-backed slot antenna, or a cavity-backed indirectly-fed slot antenna. In scenarios where antenna 40 is formed as a cavity-backed antenna, antenna elements (e.g., slot element 74 and antenna feed structure 90) for antenna 40 may be isolated from their surrounding environment such as surrounding electronic components in electronic device 10 (FIG. 1). This allows for more predictable and well-controlled antenna performance without interference from the surrounding environment. The cavity may also contribute to antenna bandwidth and/or radiation directionality for antenna 40.

As shown in FIG. 6, antenna feed structure 90 may be disposed in slot element 104 at front speaker housing wall 102F. Antenna feed structure 90 may have an upper edge that opposes an upper edge of slot element 104, thereby defining a gap. Antenna feed 62 may be coupled across the gap. A first antenna feed terminal (e.g., positive antenna feed terminal 70) may be coupled to antenna feed structure 90 on one side of the gap. A second antenna feed terminal (e.g., ground antenna feed terminal 72) may be coupled to the conductive structure on front speaker housing wall 102F on the opposing side of the gap.

A transmission line structure such transmission line 108 (e.g., a radio-frequency transmission line such as radio-frequency transmission line 60 of FIG. 3) may be coupled to antenna feed 62, thereby directly feeding antenna feed structure 90. Transmission line 108 may be coupled to antenna feed 62 from within cavity 106 or from the exterior of speaker module 100. Antenna feed structure 90 may be indirectly coupled (e.g., near-field-coupled or capacitively coupled) to the conductive structure on front speaker housing wall 102F surrounding slot element 104.

As an example, this indirect coupling may occur between the corresponding elongated edges of the antenna feed structure 90 and the parallel elongated edges of the conductive structure on front speaker housing wall 102F surrounding slot element 104 (e.g., between opposing upper edges of antenna feed structure 90 and the conductive structure surrounding slot element 104, between opposing lower edges of antenna feed structure 90 and the conductive structure surrounding slot element 104). Antenna feed structure 90 may thereby indirectly feed slot antenna resonating element 104 at front speaker housing wall 102F (e.g., through a coupling similar to coupling 96 in FIG. 5).

Front speaker housing wall 102F, top speaker housing wall 102T, and/or other walls of speaker housing member 102 may have depressions, indentations, or other recesses along their exterior surfaces to accommodate for transmission line 108 at the exterior surface of speaker housing member 102. If desired, a transmission line may be coupled to antenna feed 62 in other manners such as a transmission line provided through holes in speaker housing member 102, or in any suitable other manners.

In the example of system 100 being a speaker module, speaker components for the speaker module may be disposed within cavity 106. As shown in FIG. 6, speaker components 110 such as speakers or speaker drivers may be mounted to one or more interior surfaces of one or more speaker housing walls (e.g., to an interior surface of bottom speaker housing wall 102B). A speaker may have speaker drivers that have coils, magnets, and other electromagnetic structure that can move diaphragms in response to signals received over acoustic signal lines (e.g., through rear speaker housing wall 102R). One or more of these components for the speaker may be provided within cavity 106. Speaker components, when operated, may produce sound that is emitted through opening 104 at front wall 102F. Opening 104 at front wall 102 may include a mesh structure or other acoustically transparent speaker port material through which the sound travels.

While FIG. 6 shows a single piece of circuitry adjacent to the bottom, side, and back speaker housing walls, this is merely illustrative. If desired, other speaker components as well as non-speaker components (e.g., components in addition to or instead of components 110 in FIG. 6) may also be disposed within cavity 106 and mounted to an interior surface of speaker housing member 102.

By forming antenna 40 using one or more structures for other electronic device components such as speaker module 100, antenna 40 may implemented in a space-efficient manner, which is especially desirable in a small compact device such as a wristwatch, where space for components is at a premium. Additionally, the dimensions of a speaker box in a small compact device such as a wristwatch, when used to implement antenna 40, may be appropriately sized to offer frequency coverage at higher frequencies such as frequencies in an ultra-wideband communications band between about 5 GHz and about 8.5 GHz (e.g., a 6.5 GHz frequency band, an 8 GHz frequency band, and/or at other suitable frequencies).

Figure 7:
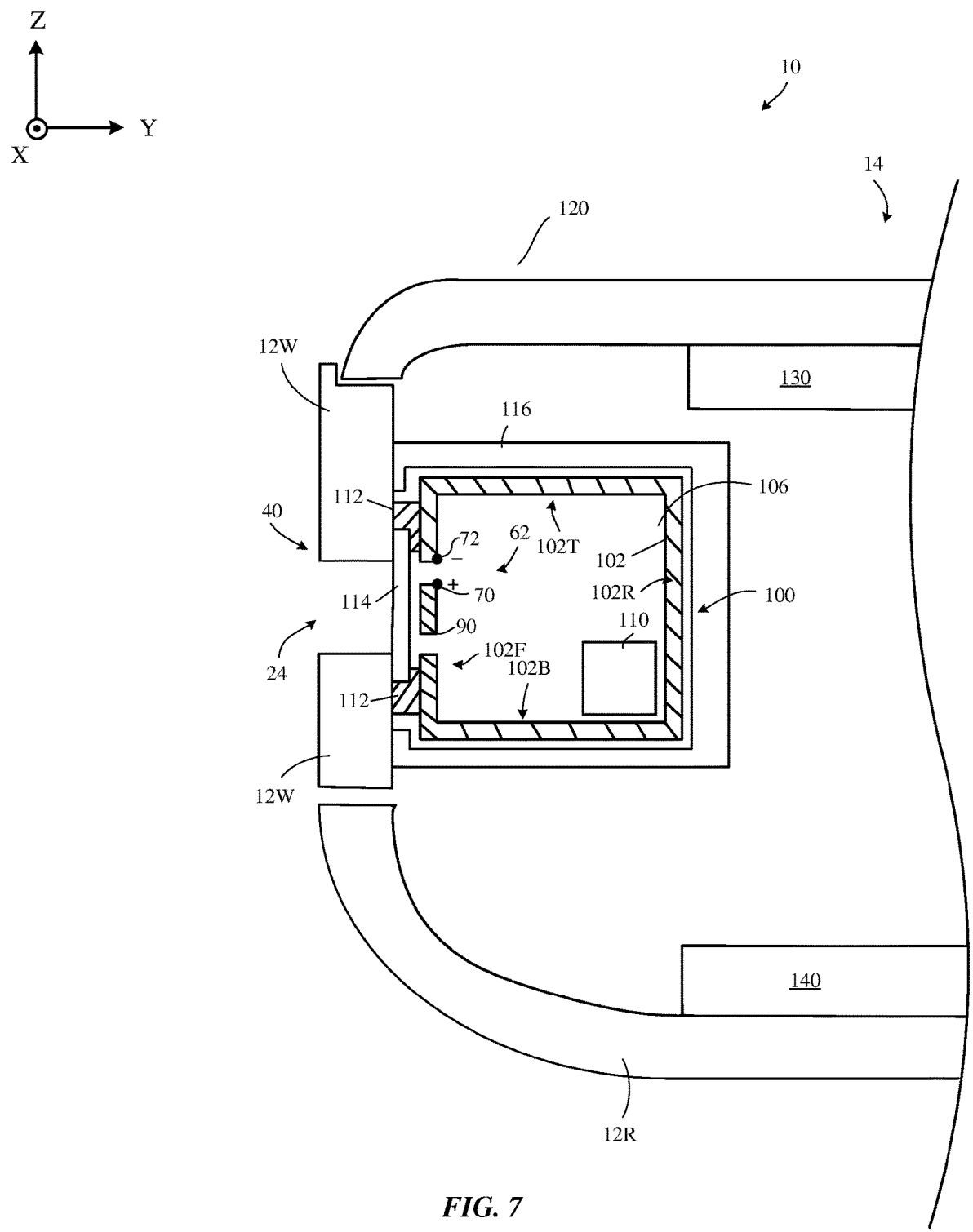
FIG. 7 is a cross-sectional side view of an illustrative electronic device having an antenna of the type shown in FIG. 6 in accordance with some embodiments.

FIG. 7 shows a cross-sectional view of electronic device 10 (taken across the central Y-Z plane of device 10 in FIG. 1) that may be provided with a speaker module of the type shown in FIG. 6. As shown in FIG. 7, electronic device 10 may have device housing sidewall 12W, device rear housing wall 12R, and cover glass 120 (e.g., a display cover glass). As an illustrative example, sidewall 12W may be formed from a conductive material, while rear housing wall 12R and cover glass 120 may be formed from one or more dielectric materials (e.g., sapphire, ceramic, plastic, glass, zirconia, etc.). Cover glass 120 may be mounted to sidewall 12W and may be secured to sidewall 12W using latches, screws, adhesive, or other attachment structures. Similarly, rear housing wall 12R may be attached to sidewall 12W using any suitable attachment structures (e.g., latches, screws, adhesive, etc.). This configuration for sidewall 12W, rear housing wall 12R, and cover glass 120 is merely illustrative. In general, any desirable materials configured in any desirable manner may be used to implement the cover glass and housing structures of device 10.

The housing sidewalls 12W as shown in FIG. 1 may include a four-sided peripheral conductive structure defining a rectangular perimeter. Two of the side (e.g., opposing sides 8 in FIG. 1) may be configured to receive wrist straps (e.g., straps 16 in FIG. 1). Referring to FIG. 7, the sidewall 12W shown in FIG. 7 may be a sidewall 12W that joins (and is perpendicular to) the two sides of the sidewalls 12W to which wrist straps may be configured to be attached. This configuration may be described herein as an example. However, if desired, device 10 may be configured to have wrist straps (and/or) buttons be coupled to the sidewall 12W shown in FIG. 7.

As shown in FIG. 7, speaker module 100 may be coupled (e.g., attached or mounted) to sidewall 12W. As an example, conductive adhesive 112 (e.g., conductive tape, conductive foam, a conductive gasket, etc.) may couple speaker housing wall 102F of speaker housing member 102 to sidewall 12W. As such, conductive adhesive 112 may mechanically attach speaker module 100 to sidewall 12W. Conductive adhesive 112 may also electrically conductive structure on the wall of speaker housing member 102 (e.g., conductive structures on the exterior surface of front speaker housing wall 102F, conductive structures on speaker housing member 102 that define slot element 104 and/or cavity 106) to sidewall 12W (e.g., serving as an electrical ground or an antenna ground). The use of a conductive adhesive is merely illustrative. If desired, speaker housing member 102 be attached to sidewall 12W using any other suitable conductive attachment structures such as screw-based attachment structures, latch-based attachment structures, clip-based attachment structures, combinations of these structures, etc. If desired, mechanical attachment members may be separate from electrical connection members when coupling sidewall 12W to speaker housing member 102.

Sidewall 12W as shown in FIG. 7 may include opening 24 (e.g., an opening elongated in the dimension of X). Speaker housing member 102 of speaker module 100 may have an opening at front speaker housing wall 102F (e.g., opening 104, the opening at which antenna feed structure 90 is disposed) that is aligned with opening 24. Opening 104 may have a matching profile or outline to opening 24 (e.g., may have the same size and/or the same shape as opening 24). In the example of FIG. 7, antenna feed structure 90 is illustratively isolated from other structures and floating within opening 104. This is merely illustrative. If desired, antenna feed structure 90 may be formed on a dielectric support structure disposed at opening 104, may be coupled to a dielectric portion of speaker housing member 102, may be coupled to a portion of speaker module 100, may be disposed at a suitable location using any other means. As an example, in the configuration of speaker housing member 102 being formed from a dielectric frame that is coated with conductive material at its external surface, the dielectric frame may have an extension that is coupled to and supports antenna feed structure 90.

A sealing member such as sealing member 114 (e.g., a sealant for liquids and/or other substances such as dust, a liquid barrier) may be placed at opening 24 (e.g., on the interior side of device 10). Sealing member 114 may provide a water-tight seal and/or a moisture seal that prevents water and/or moisture from entering into the interior of device 10 from the exterior of device 10 through opening 24. In particular, sealing member 114 may be interposed between opening 24 in sidewall 12W and opening 104 at speaker housing wall 102F. If desired, sealing member 114 may be attached to speaker housing wall 102F or any other support structure instead of sidewall 12W.

If desired, opening 24 and/or opening 104 at speaker housing wall 102F may include other sealing members or structures that prevention others materials (e.g., other than water) from entering the interior of device 10 from the exterior of device 10. As an example, opening 24 and/or opening 104 at speaker housing wall 102F may include mesh structures that prevent dust and other contaminants from entering an interior of device 10 (e.g., from entering an interior of speaker housing member 102). If desired, antenna feed structure 90 may be formed on one or more of sealing member 114, mesh structures, or other (dielectric) support structures disposed in opening 24, in opening 104, in cavity 106, and/or between opening 24 and opening 104.

If desired, device 10 may include a retaining member such as retaining member 116 such as a retaining bracket or other mechanical support structure. Retaining member 116 may surround, fully or only partially, the exterior of one or more speaker housing walls to ensure that speaker module 100 remains in place. For example, retaining member 116 may ensure the opening 24 remains aligned with opening 104, may ensure that conductive adhesive 112, sealing member 114, and/or antenna feed structure 90 remain in place to properly perform their respective functions. Retaining member 116 may be attached to a housing structure such as housing sidewall 12W by any suitable attachment structures (e.g., screw-based structures, adhesive, etc.).

The shape of speaker housing member 102 as described in connection with FIGS. 6 and 7 is merely illustrative. If desired, speaker housing member 102 may have any other desirable shape (e.g., a shape that is not a cuboid) such as an irregular cuboid shape, a shape having less than six faces, a shape having more than six faces, a shape having any desirable number of straight edges and any number of curved edges, and/or an irregular shape having extension and depressions to accommodate for other components in device 10 (e.g., to accommodate for a shape of housing components in device 10, to accommodate for internal components of device 10) and/or to tune the acoustic frequency response of speaker module 100.

As shown in FIG. 7, device 10 may include circuitry 130 at the front face of device 10 and circuitry 140 at the rear face of device 10. Device 10 may also include other circuitry in the interior of device 10. As examples, circuitries 130 and 140 may include display circuitry, touch sensor circuitry, antenna circuitry, wireless power circuitry, conductive traces, electronic component modules, and/or any other circuitry for any other functions in device 10 as disclosed in connection with FIG. 2. As device 10 may be a small compact device, circuitries 130 and 140 and other internal circuitry may be formed in close proximity to the antenna structures shown in FIG. 7 such as opening 104 and antenna feed structure 94. However, because opening 104 (e.g., the slot antenna resonating element for the antenna such as slot element 74 of FIG. 5), antenna feed 62, and antenna feed structure 90 are formed as part of speaker module 100 and surrounded by the grounded conductive speaker housing walls (to form cavity-backed antenna 40), these antenna structures may be isolated from internal components of device 10 (e.g., circuitries 130 and 140).

By forming antenna 40 based on a cavity-backed and indirectly fed slot antenna resonating element, the cavity-backed and indirectly fed slot antenna is placed in a well-controlled (e.g., well-isolated) location that is shielded from other internal components of device 10, may have an easy and flexible configuration for tuning the antenna (e.g., by changing the configuration of antenna feeding structure 90), and may have a linear polarization in a peak gain direction. Additionally, by providing the cavity-backed and indirectly fed slot antenna as described herein in a compact device such as a wristwatch device, the antenna structures may be appropriately sized (e.g., single continuous opening 24 on one side of sidewall 12W may be appropriately sized when tuned using antenna feed structure 90) to offer frequency coverage at higher frequencies such as frequencies in an ultra-wideband communications band between about 5 GHz and about 8.5 GHz.

Figure 8:
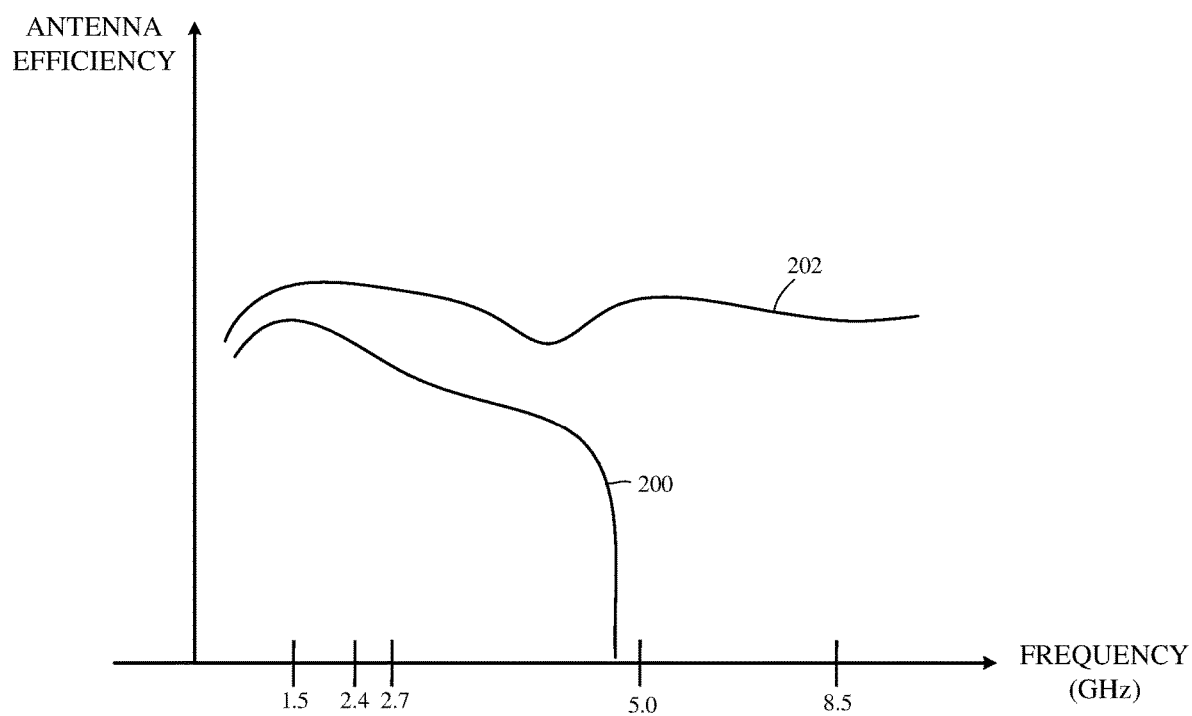
FIG. 8 is a graph of antenna performance (antenna efficiency) for illustrative antenna structures of the types shown in FIGS. 5-7 in accordance with some embodiments.

FIG. 8 is a graph in which antenna performance (antenna efficiency) has been plotted as a function of operating frequency for antennas 40 in device 10 (FIG. 2). As shown in FIG. 8, curve 200 plots the antenna efficiency of antennas 40 in device 10 in the absence of the cavity-backed and indirectly fed slot antenna as shown and described in connection with FIGS. 6 and 7. As shown by curve 200, other antenna structures for antennas 40 (e.g., antenna structures formed from display circuitry, formed on rear housing antenna structures, formed from peripheral conductive structures, etc.) may support reasonable antenna efficiencies at relatively low frequencies such as frequencies in the GPS band at 1.5 GHz, the cellular midband from 1.4 GHz to 2.2 GHz, the cellular high band at 2.2 GHz, the 2.4 GHz WLAN/WPAN band, and any other relatively low frequency bands. However, these antenna structures may be unable to provide increased bandwidth to cover relatively high frequencies such as the frequencies in the UWB communications band from about 5.0 GHz to about 8.5 GHz.

Curve 202 plots the antenna efficiency of antennas 40 in device 10 in scenarios where the cavity-backed and indirectly fed slot antenna as shown and described in connection with FIGS. 6 and 7 are present. As shown by curve 202, the other antenna structures for antennas 40 may still support reasonable antenna efficiencies at relatively low frequencies such as frequencies in the GPS band at 1.5 GHz, the cellular midband from 1.4 GHz to 2.2 GHz, the cellular high band at 2.2 GHz, the 2.4 GHz WLAN/WPAN band, and any other relatively low frequency bands. At the same time, the cavity-backed and indirectly fed slot antenna as shown and described in connection with FIGS. 6 and 7 may support efficiency peaks at higher frequencies such as frequencies in the UWB communications band from about 5.0 GHz to about 8.5 GHz. In this way, antennas 40 for device 10 may exhibit satisfactory antenna efficiency across each of these bands despite the constrained form factor of device 10. The example of FIG. 8 is merely illustrative. In general, efficiency curve 202 may have other shapes. Curve 202 (i.e., antenna 40) may exhibit efficiency peaks in any desired number of frequency bands and across any desired frequencies.

The foregoing is merely illustrative and various modifications can be made to the described embodiments. The foregoing embodiments may be implemented individually or in any combination.

What is claimed is:

1. An electronic device, comprising:
   a speaker box having an interior surface that defines a cavity and having conductive structures formed on an exterior surface of the speaker box, the conductive structures having an opening that serves as an open end for the cavity; and
   an antenna that comprises:
      a slot antenna radiating element formed from the opening, the opening being partially defined by first and second opposing edges of the conductive structures; and
      an antenna feed structure that is configured to indirectly feed the slot antenna radiating element and that has third and fourth opposing edges, the third edge being capacitively coupled to the first edge and the fourth edge being capacitively coupled to the second edge.

2. The electronic device defined in claim 1, wherein the third edge of the antenna feed structure is configured to induce an antenna current at the first edge of the conductive structures and the fourth edge of the antenna feed structure is configured to induce an antenna current at the second edge of the conductive structures.

3. The electronic device defined in claim 2, wherein the antenna further comprises an antenna feed having a positive antenna feed terminal coupled to the antenna feed structure and a ground antenna feed terminal coupled to the first edge of the conductive structures.

4. The electronic device defined in claim 3, wherein the opening is elongated along a dimension, the antenna feed structure is elongated along the dimension, and the first, second, third, and fourth edges extend along the dimension.

5. The electronic device defined in claim 3, wherein the antenna feed structure is disposed in the opening and the antenna feed is coupled across a gap between the first edge of the conductive structures and the third edge of the antenna feed structure.

6. The electronic device defined in claim 1, wherein the conductive structures surround the cavity and are coupled to a grounding structure, the slot antenna radiating element is backed by the cavity, and the antenna comprises a cavity-backed indirectly-fed slot antenna.

7. The electronic device defined in claim 6, further comprising:
   transceiver circuitry coupled to the antenna feed structure using a transmission line structure and configured to operate the cavity-backed indirectly-fed slot antenna in an ultra-wideband communications band comprising a frequency between 5 GHz and 8.5 GHz.

8. An electronic device, comprising:
   a peripheral housing structure having an aperture;
   an electronic component module that includes a module housing member with a conductive surface, the conductive surface having an opening aligned with the aperture;
   a slot antenna radiating element for an antenna, the slot antenna radiating element being formed from the opening;
   an antenna element disposed in the opening and configured to indirectly feed the slot antenna radiating element; and
   a liquid barrier interposed between the aperture and the opening.

9. The electronic device defined in claim 8, wherein the module housing member has a cavity defined by an interior surface of the module housing member and the cavity has an open end at the opening.

10. The electronic device defined in claim 9, wherein the electronic component module comprises a speaker system having speaker components in the cavity, the speaker components being coupled to the interior surface of the module housing member.

11. The electronic device defined in claim 10, wherein the antenna has an antenna feed that is directly coupled to the antenna element and the antenna element is configured to induce current to flow around a perimeter of the opening that forms the slot antenna radiating element.

12. The electronic device defined in claim 10, wherein the module housing member has first and second opposing walls, and additional walls that connect the first wall to the second wall, the conductive surface comprising an exterior surface of the first wall and respective exterior surfaces of the additional walls, and the second wall has a dielectric exterior surface.

13. The electronic device defined in claim 8, wherein the liquid barrier is aligned with the aperture and the opening and serves as a water seal configured to prevent water from entering an interior of the electronic device.

14. The electronic device defined in claim 13, wherein the module housing member is mounted to the peripheral housing structure using an attachment structure and is held in place using a retaining member.

15. The electronic device defined in claim 14, wherein the attachment structure is conductive and electrically connects the module housing member to the peripheral housing structure.

16. A wristwatch device, comprising:
 conductive peripheral sidewalls defining an interior and an exterior of the wristwatch device, wherein a given conductive peripheral sidewall of the conductive peripheral sidewalls has an elongated slot;
 a component housing member at the interior and having a cavity that extends to an elongated opening in the component housing member, the elongated opening coupling the cavity to the exterior through the elongated slot;
 a slot antenna radiating element formed from the opening in the component housing member; and
 an antenna feed structure aligned with the elongated opening and configured to indirectly feed the slot antenna radiating element.

17. The wristwatch device defined in claim 16, wherein the cavity is surrounded by conductive structures of the component housing member, an elongated opening in the conductive structures forms the elongated opening in the component housing member, and the antenna feed structure is indirectly coupled to the conductive structures across a gap.

18. The wristwatch device defined in claim 17, further comprising:
 a display cover glass attached to the conductive peripheral sidewalls;
 display circuitry mounted to the display cover glass;
 a dielectric rear housing wall attached to the conductive peripheral sidewalls; and
 antenna circuitry coupled to the dielectric rear housing wall, wherein the slot antenna radiating element, the antenna feed structure, and the cavity form a cavity-backed indirectly-fed slot antenna that is isolated from the display circuitry and the antenna circuitry.

19. The wristwatch device defined in claim 16, wherein the conductive peripheral sidewalls include an additional sidewall that opposes the given conductive peripheral sidewall, the additional sidewall being configured to receive a button member.

20. The wristwatch device defined in claim 16, wherein the conductive peripheral sidewalls include first and second additional sidewalls configured to receive a wrist strap, and the given conductive peripheral sidewall connects the first additional sidewall to the second additional sidewall.

\* \* \* \* \*